United States Patent
Weber et al.

(10) Patent No.: US 12,322,082 B2
(45) Date of Patent: Jun. 3, 2025

(54) METHOD AND SYSTEM FOR COMPLIANCE DETERMINATION

(71) Applicant: Wiretronic AB, Vänersborg (SE)

(72) Inventors: Christoffer Weber, Vänersborg (SE);
Ludwig Friborg, Gothenburg (SE);
Patrick Andersson, Gothenburg (SE);
Oscar Andersson, Västra Frölunda (SE)

(73) Assignee: Wiretronic AB, Vänersborg (SE)

( * ) Notice: Subject to any disclaimer, the term of this patent is extended or adjusted under 35 U.S.C. 154(b) by 117 days.

(21) Appl. No.: 18/037,109

(22) PCT Filed: Nov. 18, 2021

(86) PCT No.: PCT/SE2021/051152
§ 371 (c)(1),
(2) Date: May 16, 2023

(87) PCT Pub. No.: WO2022/108509
PCT Pub. Date: May 27, 2022

(65) Prior Publication Data
US 2024/0020813 A1    Jan. 18, 2024

(30) Foreign Application Priority Data
Nov. 20, 2020 (SE) .................................. 2051359-4

(51) Int. Cl.
*G06T 7/00* (2017.01)
*G06T 11/00* (2006.01)
(Continued)

(52) U.S. Cl.
CPC ............ *G06T 7/0004* (2013.01); *G06T 11/00* (2013.01); *G06V 10/82* (2022.01); *G06V 20/20* (2022.01);
(Continued)

(58) Field of Classification Search
None
See application file for complete search history.

(56) References Cited

U.S. PATENT DOCUMENTS 9,285,589 B2    3/2016  Osterhout et al.
10,311,646 B1   6/2019  Wurmfeld et al.
(Continued)

FOREIGN PATENT DOCUMENTS

WO    2020125499 A1    6/2020

OTHER PUBLICATIONS

PCT International Search Report and Written Opinion dated Dec. 8, 2021 for International Application No. PCT/SE2021/051152, 14 pages.

(Continued)

*Primary Examiner* — Edward Martello
(74) *Attorney, Agent, or Firm* — RMCK Law Group, PLC (57) ABSTRACT

The present disclosure generally relates to a computer system adapted to determine how well user manipulation of a first object using a second object is complying with a predefined task to be performed in relation to the first object. This in line with the present disclosure achieved by applying a machine learning based object processing scheme to determine a state of the first object when the user has manipulated the first object using a second object, and compare this state with data defining processing steps to be performed for completing the predefined task. The present disclosure also relates to a corresponding computer implemented method and a computer program product.

17 Claims, 5 Drawing Sheets

(51) Int. Cl.
  *G06V 10/82* (2022.01)
  *G06V 20/20* (2022.01)
  *G06V 40/20* (2022.01)

(52) U.S. Cl.
  CPC .... *G06V 40/28* (2022.01); *G06T 2207/20081* (2013.01); *G06T 2207/20084* (2013.01); *G06T 2207/30196* (2013.01)

(56) References Cited

U.S. PATENT DOCUMENTS

| | | |
|---|---|---|
| 11,803,955 B1 * | 10/2023 | Pandya .............. G08B 29/186 |
| 2007/0030339 A1 | 2/2007 | Findlay et al. |
| 2012/0075343 A1 | 3/2012 | Chen et al. |
| 2014/0310595 A1 | 10/2014 | Acharya et al. |
| 2014/0354529 A1 | 12/2014 | Laughlin et al. |
| 2018/0350055 A1 | 12/2018 | Bernal |
| 2019/0035305 A1 * | 1/2019 | Robertson .............. G06F 1/163 |
| 2019/0103037 A1 * | 4/2019 | Lussier ............. G09B 19/0069 |
| 2019/0213212 A1 * | 7/2019 | Adato ............. G06Q 10/06316 |
| 2019/0354753 A1 | 11/2019 | Worrall et al. |
| 2019/0355275 A1 | 11/2019 | Su |

OTHER PUBLICATIONS

Extended European Search Report dated Sep. 18, 2024 for EP Application No. 21895233.1, 7 pages.

\* cited by examiner

METHOD AND SYSTEM FOR COMPLIANCE DETERMINATION

CROSS-REFERENCE TO RELATED APPLICATIONS

This application is a 371 U.S. National Stage of International Application No. PCT/SE2021/051152, filed Nov. 18, 2021, which claims priority to Swedish Patent Application No. 2051359-4, filed Nov. 20, 2020. The disclosures of each of the above applications are incorporated herein by reference in their entirety.

TECHNICAL FIELD

The present disclosure generally relates to a computer system adapted to determine how well user manipulation of a first object using a second object is complying with a predefined task to be performed in relation to the first object. This in line with the present disclosure achieved by applying a machine learning based object processing scheme to determine a state of the first object when the user has manipulated the first object using a second object, and compare this state with data defining processing steps to be performed for completing the predefined task. The present disclosure also relates to a corresponding computer implemented method and a computer program product.

BACKGROUND

Recent advances in computers and communications have had impact on problem solving, allowing a user to swiftly find relevant information to solve a completely new task. Generally, the user will use an electronic device, such as a mobile phone or a computer, to query a database for relevant information. Information resulting from the query is then displayed at a display screen comprised with the electronic device.

In some recent implementations, the display screen may be integrated with a headset, possibly allowing the resulting information to be presented within the field of view of the user, possibly allowing the "real view" to be augmented with the resulting information. An example of such a headset is presented in U.S. Pat. No. 9,285,589, introducing an augmented reality system comprising a see-through display arranged to display augmented reality images in a viewing direction of the user.

Accordingly, U.S. Pat. No. 9,285,589 presents a highly interesting approach by allowing information to be displayed in the viewing direction of the user while the user simultaneously may see his general surrounding. The augmented reality system disclosed in U.S. Pat. No. 9,285,589 has shown useful in many different areas, such as for assisting a user in an unknown environment, or for provided guided instructions when working with the above mentioned completely new task.

However, even though the solution presented in U.S. Pat. No. 9,285,589 has a positive impact on general user assistance, it still relies on the user formulating the correct query to in turn be presented with in fact relevant information. Browsing through irrelevant information will of course be time consuming and possibly more invasive in case the irrelevant information is presented right in front of the eyes of the user.

Accordingly, there seems to be room for further improvements in relation to assisting a user, for example when performing a predefined task, with the general intention of ensuring that the task is performed in the best possible way.

SUMMARY

According to an aspect of the present disclosure, it is therefore provided a computer system adapted to determine a level of compliance of a predefined task performed by a user in relation to a first object, the computer system comprising a processing unit and an object capturing device, wherein the computer system is adapted to receive, from a memory element arranged in communication with the processing unit, data defining processing steps to be performed for completing the predefined task, acquire, using the object capturing device, a first representation of an area where the predefined task is to be performed, apply, using the processing unit, a machine learning based object processing scheme to the acquired first representation for identifying the first object and at least a second object involved in performing the predefined task wherein the first object is independent of the user and the second object is operated by the user-automatically identify, using the processing unit, a state of the first object based on manipulation of the first object using the second object when operated by the user, and determine, using the processing unit, the level of compliance of the predefined task based on a combination of the state of the first object and the data defining the processing steps to be performed for completing the predefined task.

The present disclosure is based upon the realization that it would provide a great advantage to allow for a way to automatically provide determine how well a predefined task is performed by a user when manipulating a first object. This is in line with the present disclosure achieved by applying a methodology for automatically identifying the first object that is to be manipulated by means of a second object being operated by the user, in correlation with data defining processing steps to be performed for completing the predefined task.

A result of the correlation may then be used by the computer system in many different ways, such as for example for determining a quality metric as to the manipulated first object, such as defining how well the user has performed the predefined task of manipulating the first object. It may also be possible and in line with the present disclosure to use the result of the correlation to point a user/operator "in the right direction", ensuring that the predefined task is completed in the best possible way.

The computer system according to the present disclosure is as would be apparent usable in relation to different areas where object manipulation is to be performed, such as for example in relation to a manual or semi-manual process where a user/operator is manipulating the first object using the second object or to an automated/autonomous manufacturing process where the user is operating the second object using e.g. some form of control system (as such defining the second object), i.e. without necessarily being in direct contact with the first object.

Thus, in line with the present disclosure the first object should be understood to be independent of the user (i.e. not forming part of the user and as such not being e.g. a hand/arm/leg of the user) while at the same time being an object that needs some form of processing, meaning that the first object may be a combination of a plurality of parts together (possibly over time) forming the first object. The first object may as such "grow" over time as the first object is manipulated (such as by including parts to the first object).

Correspondingly, the second object may also be defined as one or a plurality of elements together forming the second object.

For example, the second object may in an exemplary embodiment be seen as a hand of the user/operator, where the elements forming the second objects are the fingers of the user's/operator's hand. The second object may however also include further elements, such as a tool in the hand of the user/operator.

In the case the second object is defined as the user's/operator's hand, it may be possible to not only identify and track the hand, but to also a pose of the hand, e.g. including the position of the finger. Correspondingly, it may be possible to also determine the pose of the hand in relation to the first object and how the hand intersect with the first object. Tracking the intersecting objects could also be used to verify sensitive or restricted portions, such as a surface of the first object not being touched. Other scenarios could be verifying objects being manipulated such as for example being pushed, pressed, shaken, or moved.

The means for identifying and tracking the hand may be similar means as for generally tracking the first object, namely using a machine learning based object processing scheme. Identifying the first object as being a hand. As defined in accordance with the present disclosure, a machine learning based object processing scheme is applied for identifying the first and the second object. It may generally be desirable to ensure that the machine learning based object processing scheme has been "trained" in such a manner that the scheme swiftly recognize different object types, possibly based on previous collection of images of different types of objects. The training must however not necessarily be performed for each computer system but may be performed in a general manner and in advance when developing the machine learning based object processing scheme.

It should further be understood that the machine learning based object processing scheme additionally may be used by the computer system for identifying the state of the objects as well as for determining the level of compliance. Such a function may be formed by training the machine learning based object processing scheme based on previously collected manipulations of the first object using the second object. As an example, a vision system may have collected image data relating to manual user manipulation of the first object. The image data collected by the vision system may subsequently be used as training data for the machine learning based object processing scheme.

It should further be understood that the machine learning based object processing scheme may be implemented using one or a combination of different machine learning algorithms, also including neural networks in deep learning, also including artificial neural networks (ANN), such as but not limited to convolutional neural networks (CNN), feed-forward neural networks (FNN), etc.

The concept according to the present disclosure may generally be implemented with many different sensor systems comprised with the object capturing device for acquire the first representation of an area where the predefined task is to be performed. Examples of such sensor systems that may be comprised with the object capturing device includes an image capturing device (e.g. a camera), a Lidar, a radar, a laser scanner, a heat sensor. Other sensors systems, present and future, are of course possible and within the scope of the present disclosure. It may of course be possible to combine more than one sensor with the object capturing device, such for example an image capturing device and a Lidar.

In one embodiment the object capturing device comprises an image capturing device and the first representation comprises an image acquired using the image capturing device. In such an embodiment the machine learning based object processing scheme is represented by a machine learning based image processing scheme.

In some embodiments it may be desirable to implement the machine learning based object processing scheme as a supervised machine learning process. Due to the fact that the machine learning process is supervised, it may be possible for e.g. an operator/user to "correct" decisions made by the machine learning based object processing scheme that is deemed by the operator/user to be incorrect. In an exemplary implementation involving a supervised machine learning process it may be possible to further adapt the processing unit to access a digital storage unit comprising a previously stored collection of training objects comparable to the first and the second object, and compare the collection of training objects with objects comprised with the first representation.

It should however be understood that it in contrast to the above also may be possible to implement the machine learning based object processing scheme as an unsupervised machine learning process, allowing the implementation to be completely autonomous in the identifications and determinations. It may of course, and in line with the present disclosure, be possible to allow for a mixture of supervised and unsupervised involvement, for example depending on a state of implementation of the image processing scheme such as by allowing the machine learning based object processing scheme to initially be supervised and then later transitioning to be unsupervised or vice versa.

It may in accordance to the present disclosure be possible to allow the computer system to be further adapted to compare, using the processing unit, the determined level of compliance with a predefined threshold, and form, using the processing unit, a feedback signal if the determined level of compliance is below the predefined threshold. That is, in case it is determined that the manipulation performed by the second object is below the threshold, e.g. the user/operator may be informed in case of a manual or semi-manual process. Correspondingly, in case of the automatic/autonomous process the feedback signal formed by the computer system may possibly in an automatic manner be used for "fine tuning" the automatic/autonomous process with the purpose of adjusting the process in such a manner that subsequent manipulation results in a level of compliance that is above the threshold.

In case of manual or semi-manual process, where possibly a user is directly involved in manipulating the first object (using e.g. a tool in his hand defining the second object), the feedback signal may be used for providing the user/operator with directly relevant information for allowing an efficient task completion, where the task completion is in line with a predefined metric. As such, it should be understood that the determination of the level of compliance (as well as forming the feedback signal) may be performed in a continuous manner, meaning that the predefined task performed in relation to the first object should be understood to possibly comprise a plurality of subsequent task steps. It may accordingly be possible to ensure that the predefined task performed in relation to the first object is performed in a correct order, meaning that also the task steps should be performed in a correct order. Thus, the determination of the level of compliance is not only performed once (when the total manipulation of the first object has been performed), but in real time during the time when the first object is being manipulated. The above discussion is of course, in a slightly different manner, applicable also in relation to the automatic/autonomous process.

Furthermore, it may in accordance to the present disclosure be possible to control the formation of the feedback signal in such a manner that the feedback signal is made dependent on a difference between the determined level of compliance and the predefined threshold. Accordingly, it may in accordance to the present disclosure be possible to inform the user/operator or to adjust the automatic/autonomous process in dependence on how compliant the actual manipulation is as compared to what is expected in line with the predefinition of the task.

The feedback signal may as have been discussed above be provided to the user/operator or be provided for adjusting the automatic/autonomous process. When providing the feedback signal to the user/operator, it may be communicated using an output interface. In the simplest implementation, a light source may be illuminated if the user/operator fails with the task (i.e. below the threshold). However, it may of course be possible, and in line with the present disclosure, to generate a more complex and multifaceted feedback using e.g. one or a combination of an image or audio generating device. For example, spoken feedback may be provided in combination with an image or video clip illustration what went (possibly) wrong and how the user/operator should proceed (this and/or next time) to ensure that the manipulation is in line with the predefinition of the task.

In a preferred embodiment of the present disclosure the computer system is further adapted form an image to be provided at the output interface, wherein the image is formed, by augmenting the first representation with the feedback signal. Accordingly, any form of augmented reality (AR) scheme could in accordance to the present disclosure be used for enhancing the instruction/information provided as a feedback to the user/operator. Such AR feedback could possibly also be provided in real time as the user/operator is manipulating the first object. Possibly, the image could be provided using an electronic user device, where the electronic user device comprises the computer system comprises or is associated with the electronic user device.

The electronic user device may for example be a mobile phone held by the user in front of the first object. However, for ease of operation it may be preferred to provide a computer setup (including a camera and a display screen) in such a manner that the user/operator may collect the first representation (using the camera) and be provided with the relevant feedback (using e.g. the display screen).

However, in a preferred embodiment it may be desirable to include and/or associate the computer system with a headset having an embedded camera and display element(s) to be worn by the user/operator. The processing unit of the computer system may in some embodiments be provided separately from the headset. In some embodiments the headset may be defined as at least one of a virtual reality headset and an augmented reality headset.

As suggested, the processing unit could be provided as an embedded component of the headset. However, the processing power provided by means of the processing unit may also be provided elsewhere, away from the headset, such as at a server arranged in network communication with the headset (or more generally the generally computer system). The server may in turn be included in a cloud-based computing system, where the server is defined as a so-called cloud server. Thus, the computing power provided by means of the present disclosure may be distributed between a plurality of processing units of servers, and the location of the processing units/servers must not be explicitly defined. Advantageous following the use of a cloud-based solution is also the inherent redundancy achieved, and for the possibility of applying more complex machine learning processes as compared to what may be possible using a single embedded processing unit.

Within the scope of the present disclosure it may be possible to adapt the formation of the image to additionally be based on the data defining the processing steps to be performed for completing the predefined task. Accordingly, the image shown to the user/operator may for example in such an embodiment include direct instruction on how to complete the task. An advantage of such an embodiment is that it may be possible to train a novice user/operator to perform a novel and not previously performed task, where the user/operator is provided with continuous information on how to successfully perform such a predefined task.

To further increase the accuracy of the computer system it is in line with the present disclosure preferred to arrange the machine learning based object processing scheme to be operable to determine a mutual relation between the first and the second object, possibly in relation to an overall coordinate system within the first representation. The identification of the state of the first object may then be further based on the determined mutual relation between the first and the second object. In some embodiments it may be desirable to include more than one single camera, thus possibly allowing for the creation of a further improved first representation including for example improved accuracy in relation to three-dimensional (3D) orientation of the first and the second object, separately as well as to their mutual relation. The coordinate system within the first representation may in such an embodiment be a 3D coordinate system.

The computer system as discussed above may be useful in relation to many different situations, including general manufacturing and specifically in relation to an assembly process for the first object. One example of such an assembly process may for example include an electrical connector, such as for used in relation to the automotive industry. In such an example the first object may be defined as the electrical connector and the second object is an operable tool adapted for removal of a terminal pin or post comprised with the electrical connector.

According to another aspect of the present disclosure, there is provided a computer implemented method for operating a computer system to determine a level of compliance of a predefined task performed in relation to a first object, the computer system comprising a processing unit and an object capturing device, wherein the method comprises the steps of receiving, from a memory element arranged in communication with the processing unit, data defining processing steps to be performed for completing the predefined task, acquiring, using the object capturing device, a first representation of an area where the predefined task is to be performed, applying, using the processing unit, a machine learning based object processing scheme to the acquired first representation for identifying the first object and at least a second object involved in performing the predefined task, wherein the first object is independent of the user and the second object is operated by the user, automatically identifying, using the processing unit, a state of the first object based on manipulation of the first object using the second object when operated by the user, and determining, using the processing unit, the level of compliance of the predefined task based on a combination of the state of the first object and the data defining the processing steps to be performed for completing the predefined task. This aspect of the present disclosure provides similar advantages as discussed above in relation to the previous aspects of the present disclosure.

According to a further aspect of the present disclosure, there is provided a computer program product comprising a non-transitory computer readable medium having stored thereon computer program means for controlling a computer system adapted to determine a level of compliance of a predefined task performed by a user in relation to a first object, the computer system comprising a processing unit and an object capturing device, wherein the computer program product comprises code for receiving, from a memory element arranged in communication with the processing unit, data defining processing steps to be performed for completing the predefined task, code for acquiring, using the object capturing device, a first representation of an area where the predefined task is to be performed, code for applying, using the processing unit, a machine learning based object processing scheme to the acquired first representation for identifying the first object and at least a second object involved in performing the predefined task, wherein the first object is independent of the user and the second object is operated by the user, code for automatically identifying, using the processing unit, a state of the first object based on manipulation of the first object using the second object when operated by the user, and code for determining, using the processing unit, the level of compliance of the predefined task based on a combination of the state of the first object and the data defining the processing steps to be performed for completing the predefined task. Also this aspect of the present disclosure provides similar advantages as discussed above in relation to the previous aspects of the present disclosure.

A software executed by the processing unit for operation in accordance to the present disclosure may be stored on a computer readable medium, being any type of memory device, including one of a removable nonvolatile random access memory, a hard disk drive, a floppy disk, a CD-ROM, a DVD-ROM, a USB memory, an SD memory card, a solid state drive, other non-volatile flash based storage mediums, or a similar computer readable medium known in the art.

In summary, the present disclosure generally relates to a novel concept of determining how well user manipulation of a first object using a second object is complying with a predefined task to be performed in relation to the first object. This in line with the present disclosure achieved by applying a machine learning based object processing scheme to determine a state of the first object when the user has manipulated the first object using a second object, and compare this state with data defining processing steps to be performed for completing the predefined task.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which:

FIGS. 1A and 1B conceptually illustrates a computer system according to a currently preferred embodiment of the present disclosure, FIG. 2 schematically illustrates a possible implementation of a machine learning based object processing scheme used in conjunction with the present disclosure, FIGS. 3A-3C provides an exemplary illustration of the determination of a mutual relation between a first and a second object for manipulating the first object.

DETAILED DESCRIPTION

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled person. Like reference characters refer to like elements throughout. The following examples illustrate the present disclosure and are not intended to limit the same.

Figure 1A:
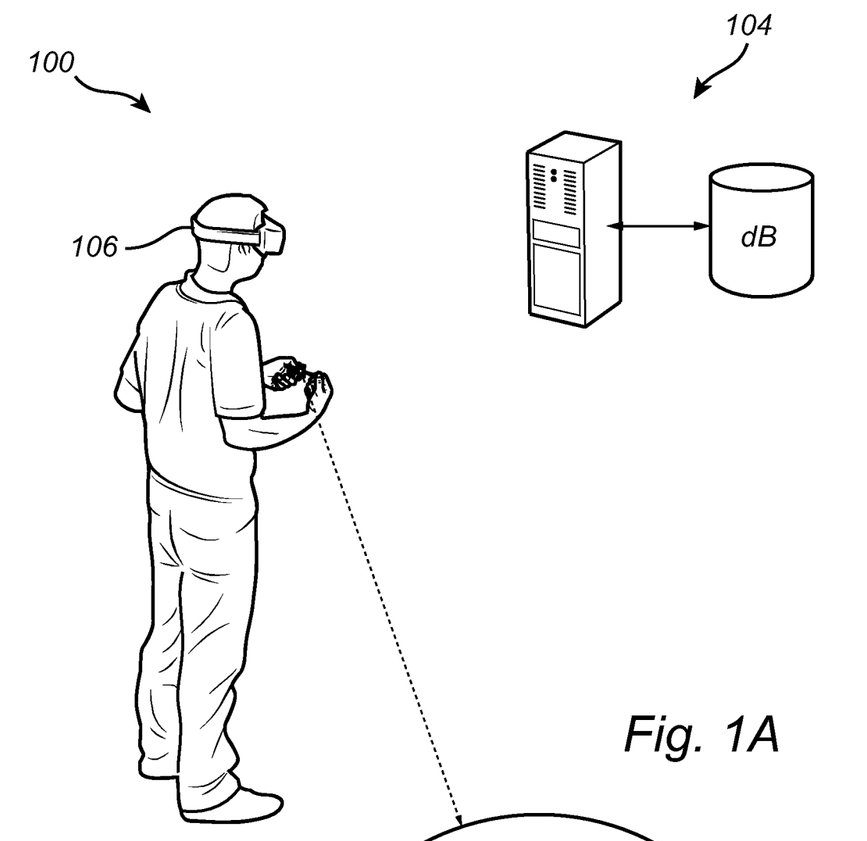
Figure 1B:
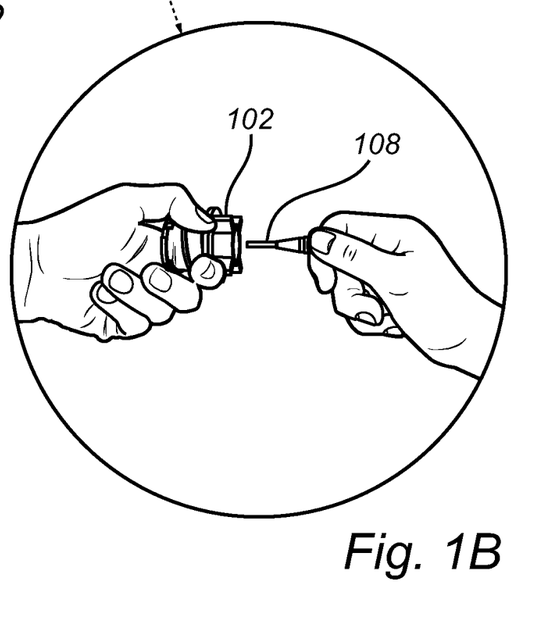

Turning now to the drawings and to FIGS. 1A and 1B in particular, there is conceptually illustrated a computer system 100 adapted for determining a level of compliance of a predefined task performed in relation to a first object, which in FIG. 1B is presented as an electrical connector 102. The computer system 100 comprises at least a server one server and database 104, where the server 104 at least includes a processing unit (not explicitly presented in FIGS. 1A and 1B).

The computer system 100 further comprises an object capturing device 106. In FIG. 1A the object capturing device, such as a video camera, is presented as embedded with an augmented reality (AR) headset 106, which implementation is known to the person skilled in the art. The AR headset 106 preferably comprises image and audio generating devices for providing information to the user/operator wearing the headset. It should be understood that the processing unit in some embodiments may be embedded within the AR headset.

For reference, the processing unit may for example be manifested as a general-purpose processor, a graphics processing unit, an application specific processor, a circuit containing processing components, a group of distributed processing components, a group of distributed computers configured for processing, a field programmable gate array (FPGA), etc. The processor may be or include any number of hardware components for conducting data, signal and/or image processing or for executing computer code stored in memory. It may also be possible and within the scope to make use of system-on-chip (SOC) implementations. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

As presented above, the present disclosure may in some embodiment make use of the computer system for assisting the user/operator in performing a task in relation to the first object 102, where the task performed in relation to the first object is performed by manipulating the first object 102 using a second object, which in FIG. 1B is illustrated as an operable tool 108 adapted for removal of a terminal pin or post comprised with the electrical connector 102. How well the task is performed is in line with the present disclosure defined by means of a level of compliance determined by the server 104.

Figure 4:
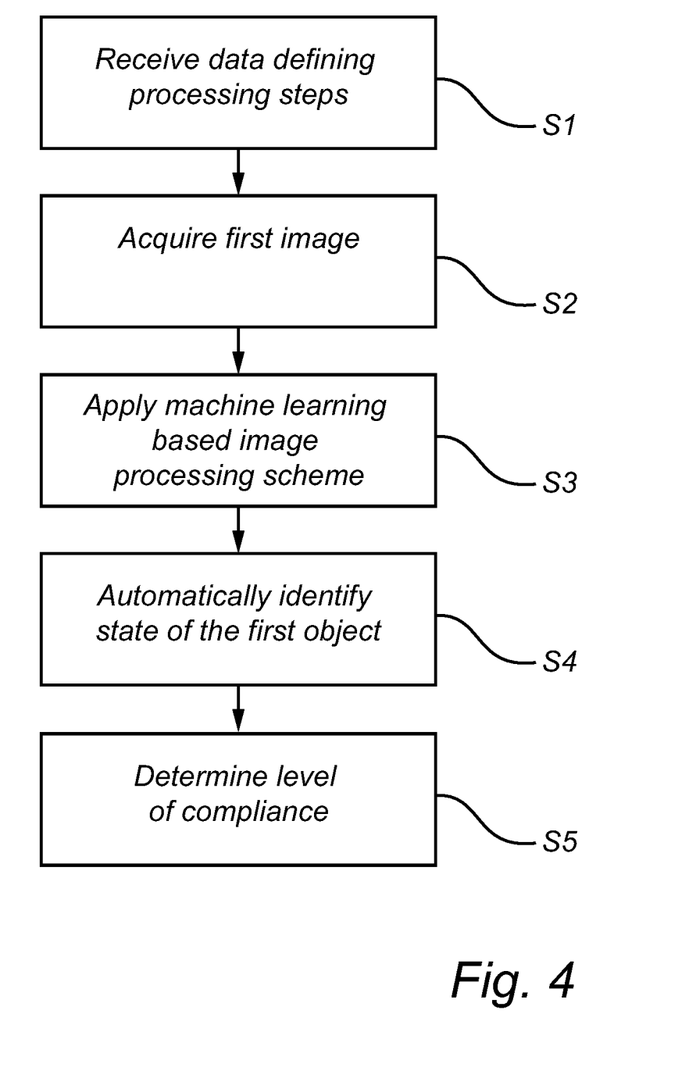
FIG. 4 is a flow chart illustrating the steps of performing the method according to a currently preferred embodiment of the present disclosure.

Accordingly, and with further reference to FIG. 4, the computer system 100 is, during operation adapted to perform a plurality of functions for determining how well the user/operator performs the task, i.e. to what level the user/operator is complying with the task at hand.

The steps performed by the computer system 100 comprises receiving, Si, from a memory element arranged in communication with the processing unit 102, such as the database, data defining processing steps to be performed for completing the predefined task. The server 104 is further adapted to acquire a first representation of an area where the predefined task is to be performed, where the first representation also includes the first object 102. The server 104 further applies, S3, the above discussed and exemplified machine learning based object processing scheme to the acquired first representation for identifying the first object 102 and at least a second object 108 (such as a hand of a user/operator), involved in performing the predefined task. Once the objects 102, 108 have been identified, possibly including their mutual relation, the server 104 automatically identifies, S4, a state of the first object based on manipulation of the first object using the second object. The server 104 may then make use of the state of the first object and the data defining the processing steps to be performed for completing the predefined task for determining, S5, the level of compliance of the predefined task.

By means of the present disclosure it is made possible to in an automatic way determine how well a predefined task is performed. The level of compliance as is determined by the present computer system 100 may be used in many different ways, such as for example for determining a quality metric as to the manipulated first object 102. It may also be possible and in line with the present disclosure to use the result of the correlation to point a user/operator "in the right direction", ensuring that the predefined task is completed in the best possible way.

By means of the inherent functionality of the AR headset it may be possible to provide an instruction to the user as how to change e.g. a manipulation of the electrical connector 102 using the operable tool 108 adapted for removal of a terminal pin or post comprised with the electrical connector 102.

Such an instruction may for example be presented as audio-based directions of use of the operable tool 108, and possibly also including an overlaid video sequence illustrating how (in a prerecorded manner) a user/operator should manipulate the connector 102 using the operable tool 108.

As discussed above, the selection of the audio/video-based directions of use of the operable tool 108 may be selected based on how well the user/operator is performing the task, in accordance to the present disclosure indicated by means of the determined level of compliance.

Figure 2A:
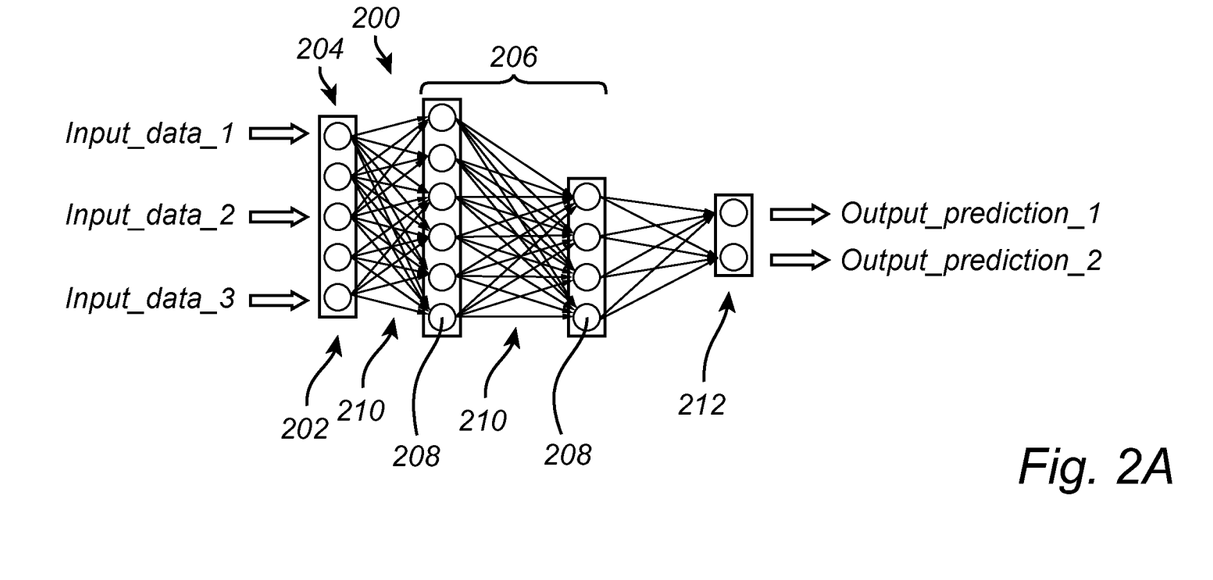
Figure 2B:
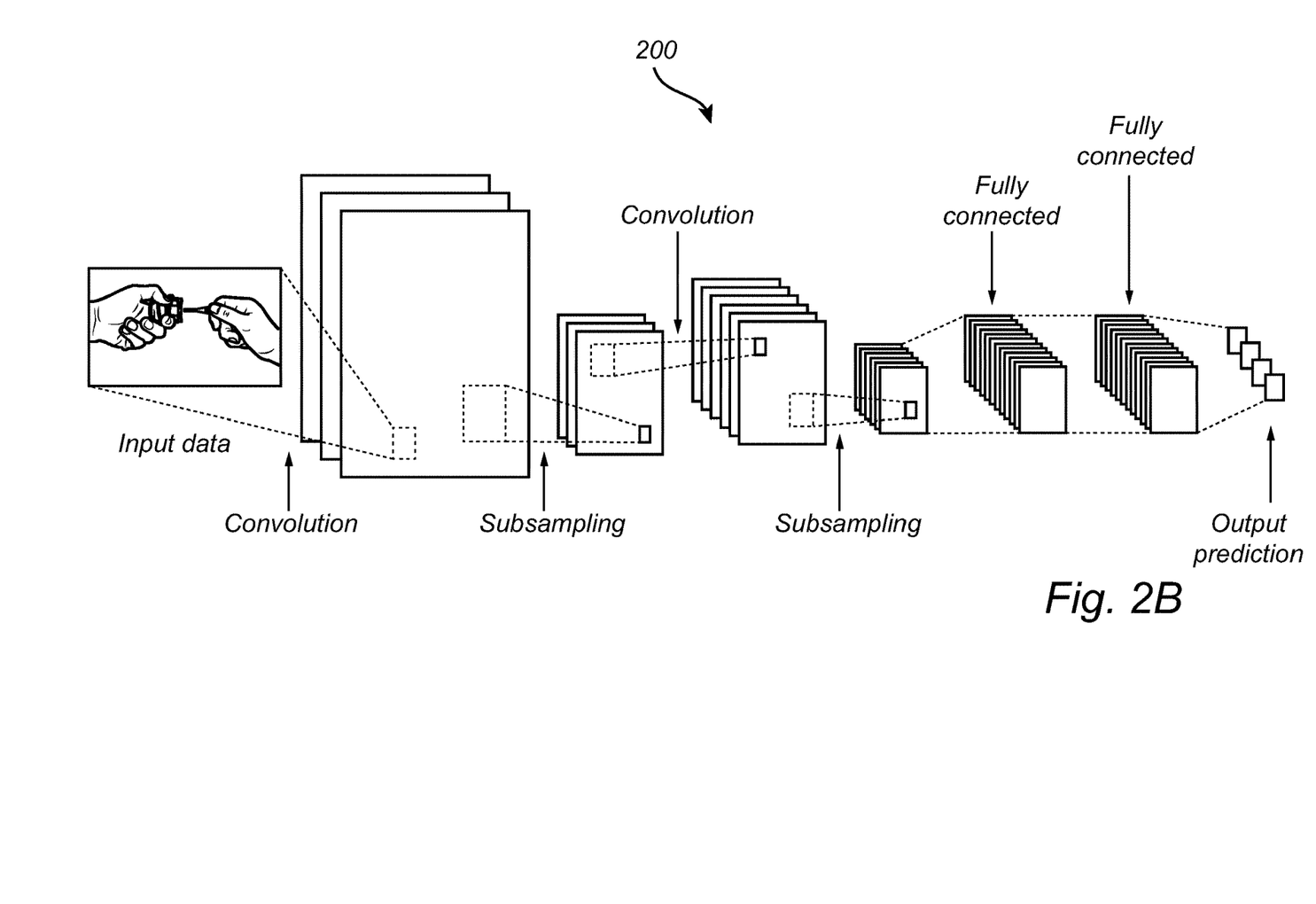

Turning now to FIGS. 2A and 2B presenting presented schematic illustrations of a possible implementation of a machine learning based object processing scheme used in conjunction with the present disclosure. Specifically, and has been discussed above, the machine learning based object processing scheme is in accordance to the present disclosure used for identifying the first object and at least a second object involved in performing the predefined task, as well as possibly for determining a mutual relation between the first and the second object and for determining the state of the first object based on manipulation of the first object using the second object. The discussion below will be focusing on how to identify the first and the second object in the first representation in combination with determining their mutual relation.

FIG. 2A illustrates a possible approach of implementing a deep neural network 200 adapted for identifying the first object and the second object, as well as how the objects are arranged in relation to each other.

The block diagram comprises an input layer 202, configured to receive input data to the deep neural network. The input data includes mathematical representations of the first representation and data relating to the processing steps to be performed for completing the predefined task. It may also be possible to include information relating to an area in which the objects are present (such as in a working area of the user/operator)

The first representation, the data relating to the processing steps to be performed for completing the predefined task and the data relating to the area in which the objects are present may be provided as matrix of data, or as a graph. The image data preferably include a time series of first representations collected (i.e. collected over time). In some embodiments the image data includes historical data (possibly in the past e.g. 1, 2, 3, 4, seconds). The input layer includes nodes 204 associated with each of the inputs.

The deep neural network 200 may also include one or more convolutional layers in block 206. A deep neural network based on recurrent layers take current data from the input layer 202 as an input in addition to previously processed data. In other words, recurrent layers are advantageously used for capturing the history of the input data.

Nodes 204 of the input layer 202 communicate with the nodes 208 of the layers 206 via connections 210. The connections 210 and weights of the connections are determined during training sessions, e.g. supervised or unsupervised training. The identified first and second object and their mutual relation are in the form of mathematical representations provided as an output in at output layer 212. It should be noted that the number of connections and nodes for each layer may vary, FIG. 2A is only provided as an example. Accordingly, in some deep neural network designs more than the indicated layers in FIG. 2A may be used.

In an exemplary embodiment of the present disclosure the machine learning based object processing scheme applies a convolutional neural network for at least portions of the object identification. In a convolutional neural network, as is known per se to the skilled person, convolutions of the input layer are used to compute the output. Local connections are formed such that each part of the input layer is connected to a node in the output. Each layer applies filters whereby the parameters of the filters are learned during training phases for the neural network.

The deep neural network may be trained based on supervised learning based on general objects expected to be included in the first representation and expected to be used for manipulating the first object. Alternatively, the deep neural network is trained by un-supervised learning based on a definition of the predetermined task to be performed and the likely objects to be used on the manipulating of the first object.

Figure 3A:
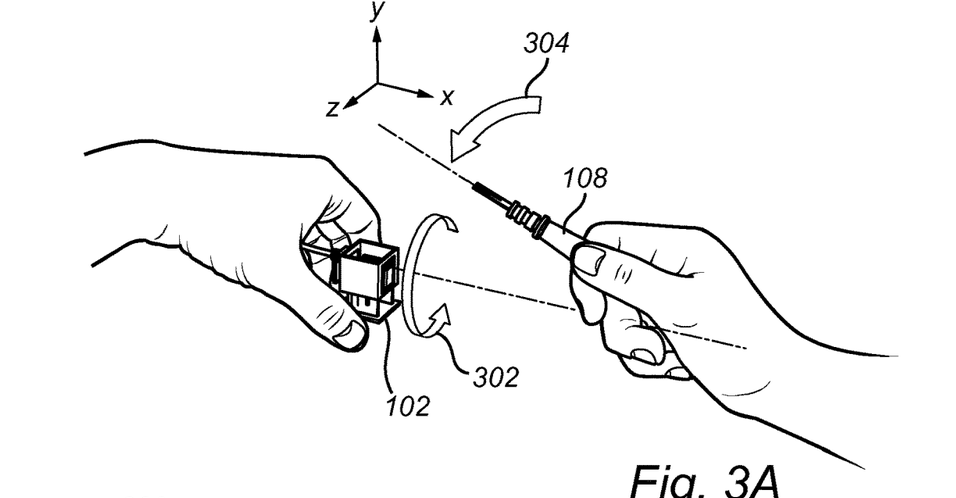
Figure 3B:
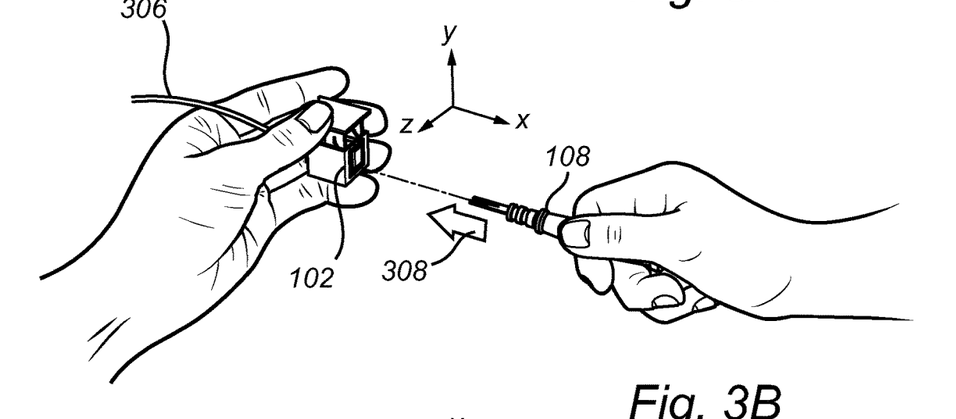
Figure 3C:
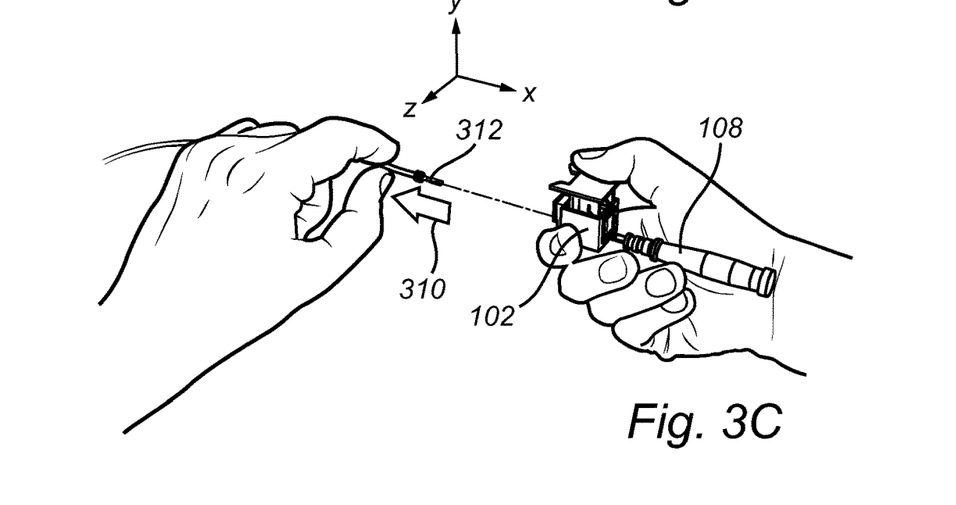

In FIGS. 3A-3C there is provided an exemplary illustration of the determination of a state of the first object, possibly applying an extension of the image processing scheme as discussed above in relation to FIGS. 2A and 2B.

In line with the discussion provided above, the user/operator is in FIGS. 3A-3C shown to be manipulating an electrical connector 102 using an operable tool 108 adapted for removal of a terminal pin or post comprised with the electrical connector 102. The user/operator holds the electrical connector 102 in his left hand and the operable tool 108 in his right hand. The predefined task to be performed by the user/operator is in the illustrated embodiment to remove a cable 306 and connected pin 312 from the electrical connector 102, involving for example of correctly inserting the operable tool 108 at a predefined position in the electrical connector 102.

FIG. 3A illustrates a starting position, as for example could be captured using the camera embedded with the AR headset 106. The image captured by the camera is in turn processed by the processing unit for automatically identifying the first and the second object, here illustrated by the electrical connector 102 and the operable tool 108. As can be seen, the separate objects within the image captured by the camera are here each oriented in a global coordinate system coordinate for the area where the predefined task is to be performed. A mutual relation between the electrical connector 102 and the operable tool 108 are however in FIG. 3A shown to not align, meaning that the state of the electrical connector 102 at present does not comply with the task to be performed. Rather, the electrical connector 102 should be rotated and the operable tool 108 should be aligned with the electrical connector 102.

For assisting the user/operator to better comply with the task to be performed, an augmentation is formed in relation to the image captured by the camera, presenting re-orientation instructions as exemplified by arrows 302 and 304. It may also be possible to present "virtual axis extensions" within the augmentation as provided to the user/operator.

Once the user has re-oriented the electrical connector 102 and the operable tool 108 such they align, and as shown in FIG. 3B, the initial predefined task may be seen as performed, meaning that a level of compliance determined by the processing unit may be defined to be above a predefined threshold, meaning that the operation performed by the user/operator complies with what is expected. Once the electrical connector 102 is aligned with the operable tool 108 aligned, a further augmentation (as exemplified by arrow 308) may be presented to the user/operator, instructing the user/operator to insert the operable tool 108 inside of the electrical connector 102.

At the time of having inserted the operable tool 108 inside of the electrical connector 102, it will be possible for the user/operator to remove the cable from the electrical connector 102, as is illustrated in FIG. 3C. The first object has thus in this embodiment not "grown" (as was discussed above) but has rather been reduced as compared to the initial state of the first object.

In any case, once the cable 306 has been removed from the electrical connector 102 the overall task to be performed in relation to the electrical connector 102 has been completed, and the user/operator complies with what is expected. A compliance level will thus be determined to be above the predetermined threshold. As a consequence, it may also be possible to form a further augmentation instructing the user/operator about this determination.

From the above it should be understood that compliance must not necessarily be seen as for performing a complete task performed in relation to the first object. Rather, it may be possible to see the task performed as being part of an overall task. Accordingly, an overall task may comprise a plurality of (sub) tasks.

Finally, even though the discussion above has been provided in relation to manipulation by a user/operator of an electrical connector 102 using an operable tool 108, the concept according to the present disclosure may be used in relation to many other types of tasks to be performed in relation to essentially any type of objects, for example fully or semi-manually by a user/operator, or automatically by e.g. a robot. The concept according to the present disclosure may for example generally be used in relation to a manufacturing industry (e.g. automotive, avionic, etc.), the building industry, at a nursery, or in any situation where it is desirable to investigate a level of compliance of a task performed (by a user and/or a robot), where it also is possible to make use of the level of compliance for improving how the task is performed.

Furthermore, the control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, solid state drives or other non-volatile flash based storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general-purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A computer system adapted to determine a level of compliance of a predefined task performed by a user in relation to a first object, the computer system comprising a processing unit and an object capturing device, wherein the computer system is adapted to:
  receive, from a memory element arranged in communication with the processing unit, data defining processing steps to be performed for completing the predefined task,
  acquire, using the object capturing device, a first representation of an area where the predefined task is to be performed,
  apply, using the processing unit, a machine learning based object processing scheme to the first representation for identifying the first object and at least a second object involved in performing the predefined task, wherein the first object is independent of the user and the second object is operated by the user,
  automatically identify, using the processing unit and the machine learning based object processing scheme, a state of the first object when the first object is manipulated using the second object, wherein the second object is operated by the user, and wherein the identification of the state of the first object is further based on a determined mutual relation between the first object and the second object, and
  determine, using the processing unit, the level of compliance of the predefined task based on a combination of the state of the first object and the data defining the processing steps to be performed for completing the predefined task,
  wherein the first object is an electrical connector and the second object is an operable tool adapted for removal of a terminal pin or post comprised with the electrical connector herein.

2. The computer system according to claim 1, wherein the computer system is further adapted to:
  compare, using the processing unit, the determined level of compliance with a predefined threshold, and
  form, using the processing unit, a feedback signal if the determined level of compliance is below the predefined threshold.

3. The computer system according to claim 2, wherein the feedback signal is dependent on a difference between the determined level of compliance and the predefined threshold.

4. The computer system according to claim 2, wherein the computer system is arranged in communication with an output interface, and the output interface is adapted to communicate the feedback signal to an operator.

5. The computer system according to claim 4, further comprising the output interface, wherein the output interface comprises at least one of an image or audio generating device.

6. The computer system according to claim 2, wherein the computer system is further adapted to:
  form, using the processing unit, an image to be provided at the output interface, wherein the image is formed by augmenting the first representation with the feedback signal.

7. The computer system according to claim 6, wherein the formation of the image is further based on the data defining the processing steps to be performed for completing the predefined task.

8. The computer system according to claim 1, wherein the first representation comprises a set of representation.

9. The computer system according to claim 1, wherein the machine learning based object processing scheme is based on an unsupervised machine learning process.

10. The computer system according to claim 1, wherein the machine learning based object processing scheme is based on a supervised machine learning process.

11. The computer system according to claim 1, wherein the machine learning based object processing scheme is based on a combination of an unsupervised and a supervised machine learning process.

12. The computer system according to claim 9, wherein the processing unit is further adapted to:
  access a digital storage unit comprising a previously stored collection of training objects comparable to the first and the second object, and
  compare the collection of training objects with objects comprised with the first representation.

13. The computer system according to claim 1, wherein the object capturing device comprises at least one of an image capturing device, a Lidar, a radar, a laser scanner, or a heat sensor.

14. The computer system according to claim 1, wherein the first representation comprises an image.

15. An electronic user device, comprising a computer system according to claim 1.

16. The electronic user device according to claim 15, where the electronic user device is at least one of a virtual reality headset, an augmented reality headset and a computer setup.

17. A computer implemented method for operating a computer system to determine a level of compliance of a predefined task performed by a user in relation to a first object, the computer system comprising a processing unit and an object capturing device, wherein the method comprises the steps of:
  receiving, from a memory element arranged in communication with the processing unit, data defining processing steps to be performed for completing the predefined task,
  acquiring, using the object capturing device, a first representation of an area where the predefined task is to be performed,
  applying, using the processing unit, a machine learning based object processing scheme to the acquired first representation for identifying the first object and at least a second object involved in performing the predefined task, wherein the first object is independent of the user and the second object is operated by the user,
  automatically identify, using the processing unit and the machine learning based object processing scheme, a state of the first object when the first object is manipulated using the second object, wherein the second object is operated by the user, and wherein the identification of the state of the first object is further based on a determined mutual relation between the first object and the second object, and determining, using the processing unit, the level of compliance of the predefined task based on a combination of the state of the first object and the data defining the processing steps to be performed for completing the predefined task,
wherein the first object is an electrical connector and the second object is an operable tool adapted for removal of a terminal pin or post comprised with the electrical connector herein.

* * * * *